United States Patent
Haug

(10) Patent No.: US 7,322,119 B2
(45) Date of Patent: Jan. 29, 2008

(54) BEADED JEWELRY MANDREL AND METHOD OF JEWELRY ASSEMBLY

(76) Inventor: Cheri Marie Haug, 1008 19th St. South, La Crosse, WI (US) 54601

( * ) Notice: Subject to any disclaimer, the term of this patent is extended or adjusted under 35 U.S.C. 154(b) by 0 days.

(21) Appl. No.: 11/650,109

(22) Filed: Jan. 8, 2007

(65) Prior Publication Data

US 2007/0107245 A1 May 17, 2007

Related U.S. Application Data

(63) Continuation of application No. 10/913,838, filed on Aug. 6, 2004, now Pat. No. 7,181,858.

(60) Provisional application No. 60/496,719, filed on Aug. 20, 2003.

(51) Int. Cl.
*G01B 3/34* (2006.01)
*A41H 1/00* (2006.01)

(52) U.S. Cl. .................. 33/544.4; 33/2 R; 33/17 R; 33/514.1

(58) Field of Classification Search ............ 33/544.4, 33/514.1, 514.2, 1 B, 564, 565, 2 R, 567, 33/555.1, 2 A, 2 H, 7, 8, 9 R, 11, 16, 17 R; 434/365; D10/64
See application file for complete search history.

(56) References Cited

U.S. PATENT DOCUMENTS

| | | | | |
|---|---|---|---|---|
| 69,954 A * | 10/1867 | Richards | ............... | 33/544.4 |
| 146,974 A * | 2/1874 | Allen | ............... | 33/514.1 |
| 291,373 A * | 1/1884 | McDowell | ............... | 33/544.4 |
| 343,582 A * | 6/1886 | Hardwood | ............... | 33/544.4 |
| 458,564 A * | 9/1891 | Engel | ............... | 33/514.1 |
| 800,696 A * | 10/1905 | Wagner | ............... | 33/514.2 |
| 944,639 A * | 12/1909 | Sell et al. | ............... | 33/9 R |
| 1,007,431 A * | 10/1911 | Davenport | ............... | 33/9 R |
| 1,199,284 A * | 9/1916 | Lieser | ............... | 33/544.4 |
| 1,210,963 A * | 1/1917 | Mascher | ............... | 33/544.4 |
| 1,221,522 A | 4/1917 | Farquharson | | |
| 1,264,519 A * | 4/1918 | Hinson | ............... | 72/477 |

(Continued)

OTHER PUBLICATIONS

Screen shot of ShorInternational.com/RingSizer.htm. On line catalog pages. Shor International Corporation, 20 Parkway West, Mt. Vernon, NY 10552.

(Continued)

*Primary Examiner*—R. Alexander Smith
(74) *Attorney, Agent, or Firm*—Tipton L. Randall

(57) ABSTRACT

A method for making beaded jewelry is provided. The method utilizes a megaphone shaped device having a small diameter first end and a larger diameter second end. The circumference of the first end is that of one part of the human body, such as a child's wrist. The circumference of the second end is the size of another part of the human body, such as an adult ankle. Markings on the girth of the device sequentially graduate in circumference and define graduated bracelet, anklet and other jewelry sizes. When one is making a bracelet or other article of jewelry of strung beads, the diameter of the beads affects the finished length of the article. Use of the device takes into account the diameters of the beads and thereby ensures that the finished item of beaded jewelry will fit the intended wearer.

8 Claims, 10 Drawing Sheets

U.S. PATENT DOCUMENTS

| | | | | |
|---|---|---|---|---|
| 1,271,394 | A | * | 7/1918 | Wade .................... 33/9 R |
| 1,282,772 | A | * | 10/1918 | Dinhofer ............... 33/514.1 |
| D60,612 | S | | 3/1922 | Ford |
| 1,424,082 | A | * | 7/1922 | Clopton ................ 33/679.1 |
| 2,038,576 | A | * | 4/1936 | Krein ..................... 229/400 |
| 2,171,484 | A | * | 8/1939 | Squire .................. 210/497.2 |
| 2,187,769 | A | * | 1/1940 | Carew .................... 229/400 |
| 2,260,452 | A | * | 10/1941 | Hart ..................... 242/118.32 |
| 2,312,460 | A | * | 3/1943 | Williams ................ 434/365 |
| 2,942,571 | A | * | 6/1960 | White .................... 116/63 R |
| 3,026,779 | A | * | 3/1962 | Majer .................... 493/108 |
| 3,053,248 | A | * | 9/1962 | Daymon ................ 126/681 |
| 3,292,261 | A | * | 12/1966 | Hayes .................... 33/2 R |
| 3,508,372 | A | * | 4/1970 | Wallerstein et al. ....... 53/399 |
| 3,658,421 | A | * | 4/1972 | Shelton .................. 356/72 |
| 4,219,029 | A | * | 8/1980 | Grossman et al. ....... 600/587 |
| D277,397 | S | | 1/1985 | Arthur |
| 4,490,921 | A | * | 1/1985 | Woods et al. ............ 33/476 |
| 4,761,137 | A | * | 8/1988 | Taylor et al. ............. 434/99 |
| 4,875,296 | A | * | 10/1989 | Holzmeister et al. ...... 33/770 |
| 4,964,222 | A | * | 10/1990 | Keener .................. 33/544.4 |
| 5,353,513 | A | | 10/1994 | Round |
| 5,402,679 | A | * | 4/1995 | Vogel ..................... 73/427 |
| 5,722,174 | A | * | 3/1998 | Repp ...................... 33/12 |
| 5,850,709 | A | * | 12/1998 | Mahoney ............... 47/1.01 R |
| D467,619 | S | | 12/2002 | Fullalove |
| 6,640,460 | B1 | | 11/2003 | Nabarro et al. |
| 6,775,921 | B2 | * | 8/2004 | Spark et al. ............. 33/706 |
| 7,181,858 | B2 | * | 2/2007 | Haug ..................... 33/544.4 |
| 2005/0034317 | A1 | * | 2/2005 | Burandt et al. .......... 33/512 |
| 2007/0151116 | A1 | * | 7/2007 | Malandain .............. 33/512 |

OTHER PUBLICATIONS

Screen shot of http://www.widgetsupply.com/miva/merchant.mvc?page=WS/PROD/jeweler-tool-other/SCA3-JT132BS, Widget Supply, P.O. Box. 3282, Albany, OR 97321.

Screen shot of http://shorinternational.com/MandrelRingBracelet.htm, On line catalog pages. Shor International Corporation, 20 Parkway West, Mt. Vernon, NY 10552.

* cited by examiner

BEADED JEWELRY MANDREL AND METHOD OF JEWELRY ASSEMBLY

CROSS-REFERENCE TO RELATED APPLICATIONS, IF ANY

This application claims the benefit under 35 U.S.C. §119(e) of now abandoned provisional application Ser. No. 60/496,719, filed 20 Aug. 2003. Application Ser. No. 60/496,719 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates in general to a mandrel to aid in the construction of beaded bracelets, ankle bracelets, necklaces, head bands, thigh garters and upper arm bracelets.

2. Background Information

In the jewelry arts, beads are strung on cords comprised of, for example, monofilament, or jewelry wire. An interengaging but releasable cooperating clasp pair is attached and the strand of beads forms a closed loop to become an article of jewelry, such as a necklace or bracelet.

In constructing an item of beaded jewelry, the beading wire is held in one hand and beads are strung onto it with the other hand. When enough beads have been strung, the clasp is attached to the wire thereby forming a closed loop of strung beads. If the finished item does not fit the intended wearer, the item must be taken apart and re-made in a different size. This results in wasted time and wasted materials.

To illustrate, when one makes a bracelet that measures 7" in length while lying flat linearly, that same bracelet will not fit around a 7" circumference wrist. This is owing to the fact that the radius of the beads decreases the inside circumference of the finished bracelet when clasped around the wrist. The beading wire or thread, being threaded through the holes of the beads, is not snug against the wrist, but rather is suspended through the holes of the beads, a distance away from the wrist. This distance is equal to the radius of the beads. So, a bracelet made entirely with half inch diameter beads will increase the bracelet's finished diameter by the radius of the beads, ¼ inch, multiplied by two, thus, ½ inch. As the inside diameter of the loop of beads is decreased, so too is its circumference.

The problem is more troublesome when making many different bracelets with different size beads. The problem of making a piece of beaded jewelry to fit the wearer is also complicated by the fact that beads are available in numerous diameters. Using a printed chart that correlates bead size to finished bracelet size is rendered useless because jewelry is often made with a mix of bead sizes. Without working out mathematical equations to determine how a change in diameter affects the bracelet's circumference, one must have the intended wearer present for repeated fittings. Further, the beaded article of jewelry must be made with sufficient room for comfortable muscle movement. The foregoing holds true for ankle bracelets (anklets), tight necklaces (chokers), arm bands, thigh garters and head bands.

As those familiar with the art of jewelry making will appreciate, working out a mathematical equation is simply too tedious. And the problem is further complicated by the fact that long cylindrical beads will necessitate a longer bracelet whose length is virtually impossible to determine by way of a mathematical equation.

Until now, the only alternative was to have the intended wearer present for repeated fittings or to just guess at the correct size and risk making an error.

With the use of the present invention a person merely has to string some beads, hold the strand of beads around the mandrel of the present invention and determine whether beads need to be added or removed before finishing it off with a clasp.

Some examples of inventions used in sizing finished and unfinished jewelry for which patents have been granted include the following.

Round, in U.S. Pat. No. 5,353,513, describes a ring and finger sizer. The device consists of a flat plastic device with numerous holes through which a person will place his or her finger to determine the ring size. One portion of the device is a flat triangular shape over which a person will slip his or her ring to determine the size of the ring.

C. A. Ford designed a tape measure to determine the appropriate ring size for a finger in patent D60,612.

Measuring devices to aid in clothing design and tailoring have been patented.

Fullalove, in U.S. Pat. No. D467,619S and D444,818 describes a dress maker's form.

Arthur designed a dress maker's form shown in U.S. Pat. No. D277,397. Farquharson also designed a dress form in U.S. Pat. No. 1,221,522.

Nabarro in U.S. Pat. No. 6,640,460 describes a tape measure device which allows a person to measure his or her torso without the necessity of holding the tape measure. It allows one to keep one's hands free to make necessary adjustments to a garment while the tape measure is in place.

Devices available to jewelers for measuring finished items of jewelry to determine their size include the following.

Shor International sells a "Bracelet and Ring Gauge" consisting of a triangular piece of flat metal with size markings on it for use in measuring flat stock for proper sizing of ring and bracelet shanks. ShorInternational.com/RingSizer.htm.

"Ring Size Sticks" are also sold by Shor International. These ring mandrels are made of plastic or metal and are used in determining the size of a finished ring. A jeweler often needs to determine the size of a customer's ring in order to help the customer purchase another ring of the same size. ShorInternational.com/RingSizer.htm.

Devices available to jewelers for measuring the human body to find appropriate jewelry size include the following.

Shor International sells a bracelet gauge which consists of a metal version of a tape measure. On one end of the tape measure is a pin which mates with holes along the circumference of the tape measure. It is used to measure a person's wrist to determine bracelet size. ShorInternational.com/RingSizer.htm. Shor International Corporation, 20 Parkway West, Mt. Vernon, N.Y. 10552.

Shor International also sells finger gauges which consist of a series of metal rings attached to a larger ring. A person puts his or her finger in several of the rings to determine the appropriate ring size. ShorInternational.com/RingSizer.htm.

Widget Supply sells a bangle bracelet sizer similar to Shor International's finger gauges. It consists of a series of metal rings representing bracelet sizes. A person slips his or her hand through the ring to find the appropriate bangle bracelet size. http://www.widgetsupply.com/miva/merchant.mvc?page=WS/PROD/jeweler-tool-other/SCA3-JT132BS, Widget Supply, P.O. Box 3282, Albany, Oreg. 97321

Devices available to jewelers that act as a support for jewelry during its manufacture include the following:

In the metal smithing art, mandrels have long been used for making bangle bracelets of precious metal. Such mandrels are typically made of a heavy material such as steel. Their purpose is to support silver, gold, copper or brass material as it is hammered into shape around the mandrel. Thus, a bracelet can be formed into a "C" shape and slipped onto the wrist. Also, the metal can be hammered into a closed circle or doughnut shape forming a bangle bracelet that can slide over the hand and onto the wrist. Similar mandrels are used for making bracelets of blown glass. Such mandrels can be seen in Shor International's on line catalog at http://shorinternational.com/MandrelRingBracelet.htm Existing mandrels can be found only in sizes for bracelets but not for anklets. This is likely owing to the fact that a solid metal bracelet would be uncomfortable to wear considering the movement of the ankle muscles and tendons.

Some of these metal bracelet mandrels are cone shaped and some are in the shape of a terraced cone. The terraced cones typically are sectioned into 3 or 4 wrist sizes for the purpose of making 3 or 4 different sized bangle style metal bracelets.

Existing bracelet mandrels are made of metal suitable for hammering or applying heat, and are simply too clumsy and heavy for a beading artist's purpose. http://shorinternational.com/MandrelRingBracelet.htm Shor International also sells metal ring mandrels for use in metal smithing. The purpose of such a mandrel is to aid in making a ring of a specified size for the wearer. The ring mandrel serves as a support for the precious metal being formed into a ring. It also serves as a measuring device for the finished ring. http://shorinternational.com/MandrelRingBracelet.htm Rings mandrels have markings showing the various ring sizes. Ring sizes are not measured in either inches or centimeters. Rather, these markings refer to a standardized system of ring sizing.

There does not exist a mandrel suitable for beaded articles of jewelry. Making a beaded article of jewelry is different from metal finger ring and metal bracelet manufacture in that a beaded article of jewelry is made on a thread, cord or beading wire. A finger ring is comprised of a solid piece of metal. The finger ring must be hammered to size. A beaded article of jewelry on the other hand is made on a stringing material that is held in the hands or lies on a work surface. Unlike a finger ring or metal bracelet, a beaded article of jewelry is not constructed around a mandrel since hammering is not needed. The problem faced by the jewelry designer is determining the finished circumference of a product that is constructed in a linear fashion.

Metal bracelet mandrels only accommodate one to three different sizes and have very few markings indicating size. This is owing to the fact that a metal bracelet only needs to be made in a few sizes; small, medium and large. The wearer of a metal bracelet can bend the bracelet to fit the wrist. So, making a particular style of metal bracelet in infinite sizes is not necessary.

Beaded bracelets on the other hand are not so easily adjusted. The beaded bracelet must be made in the right size so that it will comfortably fit on the wearer's wrist. Some people like a bracelet to fit snugly while others prefer it to slide down onto the hand a bit. So, while one person with a seven inch wrist will be comfortable with a bracelet that fits a 7.5 inch circumference, another person would prefer it to fit an 8 inch circumference. Similarly, a person with a 7.25 inch wrist will have different needs entirely.

It is fashionable for children as young as four to wear bracelets. Their wrists typically measure about 4 inches to 5 inches in circumference. Pre-teens have a normal wrist measurement of about 6 inches and adults usually measure between 6.5 and 7 inches. It is not at all unusual for an adult to have an 8 or 9 inch wrist. Beaded ankle bracelets or "anklets" are also popular. Adult ankles normally measure about 9 inches but can be as large as 14 or 15 inches. The bracelet mandrels in the prior art do not accommodate this range of sizes.

Also in the prior art are written charts which can be made showing the number of beads needed to make a particular size bracelet. For example, such a chart could show that one would need 444 mm beads to make a 7 inch long strand. The difficulty with such a chart is that any given bracelet, anklet or necklace may typically be made with beads of several different sizes. Also, if one uses tube shaped beads, the finished circumference of the bracelet will be affected by not only the diameter of the bead, but also by the length of the bead owing to the fact that long straight beads are surrounding a round object such as a wrist.

Working out a mathematical equation using the "Pi R squared" formula can be complicated and time consuming and beyond the skill and patience of many bead artists. Because most beads are made in other countries their sizes are always designated by the metric system. Factoring in the conversion from metric to English only adds another level of difficulty.

Heretofore, the jewelry artisan had to guess at the length of a bracelet or anklet and repeatedly try it on the intended wearer's wrist or ankle. This resulted in frequent mistakes wherein a bracelet was either too small or too large for the intended wearer. This in turn resulted in a waste of beading materials and time. The problem is amplified when the designer is making jewelry professionally and in high volume. The problem is even greater when one is doing business over the internet and the customer must mail the bracelet back to the designer to be remade. Regardless of one's level of experience in jewelry making, the sizing problem remains because bracelets can be made in an infinite variety of sizes using an infinite variety of shapes and sizes of beads.

Metal smithing mandrels serve as a support for metal. Ring sizers serve to determine the size of a piece of jewelry that a person brings to a jeweler to check its size. Other devices in the prior art act as a tape measure to measure various parts of the human body. But none of the devices available serve as a body form to help the designer analyze the circumference of beaded jewelry and facilitate the making of adjustments.

Unlike bracelet mandrels used by metal smiths, the beaded jewelry mandrel of the present invention is light weight, accommodates a broad range of sizes and in the preferred embodiment measurement markings are made at one quarter of an inch intervals. Metal mandrels used by metal smiths have only 3 different sizes of bracelets inscribed on them. As mentioned above, metal bracelets are bendable and there is not the same necessity for a broader range of sizes. Metal mandrels are utterly useless to the beaded jewelry designer. Because metal bracelets can be made in different widths, the working surface area for each bracelet size must be greater, typically 2 inches or more. So, in order to keep the metal mandrel small enough to place on a metal smith's workbench, the mandrel can only accommodate a few sizes. The working area on the beaded jewelry mandrel of the present invention is relatively small since only a small surface area of the beaded bracelet makes contact with the mandrel. Therefore, the various size markings can be close together.

While existing mandrels for metal and glass work accommodate only 3 or 4 sizes of jewelry, the mandrel of the present invention in its preferred embodiment will accommodate every wrist and ankle size from children's sizes to adult sizes.

Accordingly, there is a need in the jewelry making art for a relatively simple, low cost apparatus that is useful for determining the finished length of a beaded article of jewelry without the intended wearer being present for repeated fittings. The need likewise exists for a method of making not only bracelets, but also anklets, children's bracelets and chokers. Because the beaded jewelry craft is by its nature, very portable, the apparatus should be light weight and compact for easy transportation.

SUMMARY OF THE INVENTION

The present invention is a megaphone shaped device with parallel measurement indicia visible on its exterior. The measurement indicia are perpendicular to the longitudinal axis of the mandrel. The parallel lines sequentially graduate in diametrical size and define graduated jewelry sizes. The lines are identified as to jewelry size by measurement indicia imprinted adjacent to the parallel line indicia. The parallel line indicia designate the circumference of the device at regular intervals, for example, every quarter of an inch in circumference. The circumference of the device at its smaller end is the size of one body part, for example, a child's wrist. The circumference of the device at its larger end is the size of another body part, for example, an adult's ankle.

The mandrel can be made of a transparent material with the indicia imprinted on the interior surface and visible through the exterior. Instead of a megaphone shape, the mandrel can also be made in a cone shape, a terraced cone, a terraced megaphone, a series of cylinders or a jelly roll shaped device that rolls upon itself. Regardless of its shape, the purpose of the beaded jewelry mandrel is to serve as a designer's model for sizing the finished article and avoid the need for the intended wearer to be present for repeated fittings.

It is an object of the present invention to aid in the construction of articles of beaded jewelry so that the diameter of the beads can be taken into consideration in determining the finished length of the article.

It is an object of the present invention to eliminate the guess work of proper jewelry sizing for both experienced jewelry artisans and newcomers to the craft.

It is an object of the present invention to facilitate the construction of an article of beaded jewelry so that the size of the chosen clasp can be taken into consideration in determining the finished length of the item.

It is an object of the present invention to aid in the construction of a bead bracelet, anklet, necklace, upper arm bracelet, thigh garter or head band so that the proper size of the finished jewelry can be determined at quarter of an inch intervals or the approximate metric equivalent.

It is an object of the present invention to accommodate and aid in the construction of the many different sizes of wrists, ankles, arms, thighs, heads and necklaces.

It is an object of the present invention to provide a light weight tool for jewelry sizing that can be easily transported with the jewelry designer's other beading tools and beads.

It is an object of the present invention to avoid wasting time and materials making beaded articles of jewelry that do not fit the intended wearer.

It is an object of the present invention to provide an economical tool for beaded jewelry sizing.

It is an object of the present invention to provide a method for determining the proper size of beaded jewelry without the necessity of charts or mathematical calculations.

It is an object of the present invention to eliminate the need to have the intended wearer present for proper fit of an article of beaded jewelry.

It is an object of the present invention to provide a tool and method of making an article of beaded jewelry so that the jewelry artisan can easily allow for enough slack in the article suitable for the intended wearer's needs.

It is an object of one embodiment of the present invention that it be assembled by the consumer and that it be shipped from the manufacturer or distributor as a flat item. This will result in low shipping costs and small quantities of the product could be shipped in envelopes, thereby reducing shipping costs further.

It is an object of the present invention to provide a tool and method to aid in determining a finished circumference of a product that is constructed in a linear fashion.

It is an object of the present invention to avoid repeated assembly and disassembly of the article of jewelry in attempting to find the appropriate finished length.

It is an object of the present invention to provide a tool that is light weight for easy portability and inexpensive to ship to the end user.

It is an object of the present invention to aid in high volume production of articles of beaded jewelry.

These and other objects and advantages of the present invention will be fully apparent from the following description, when taken in connection with the annexed drawings.

A more detailed explanation of the invention is provided in the following description and claims, and is illustrated in the accompanying drawings.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION AND OPERATION OF THE INVENTION

Figure 1:
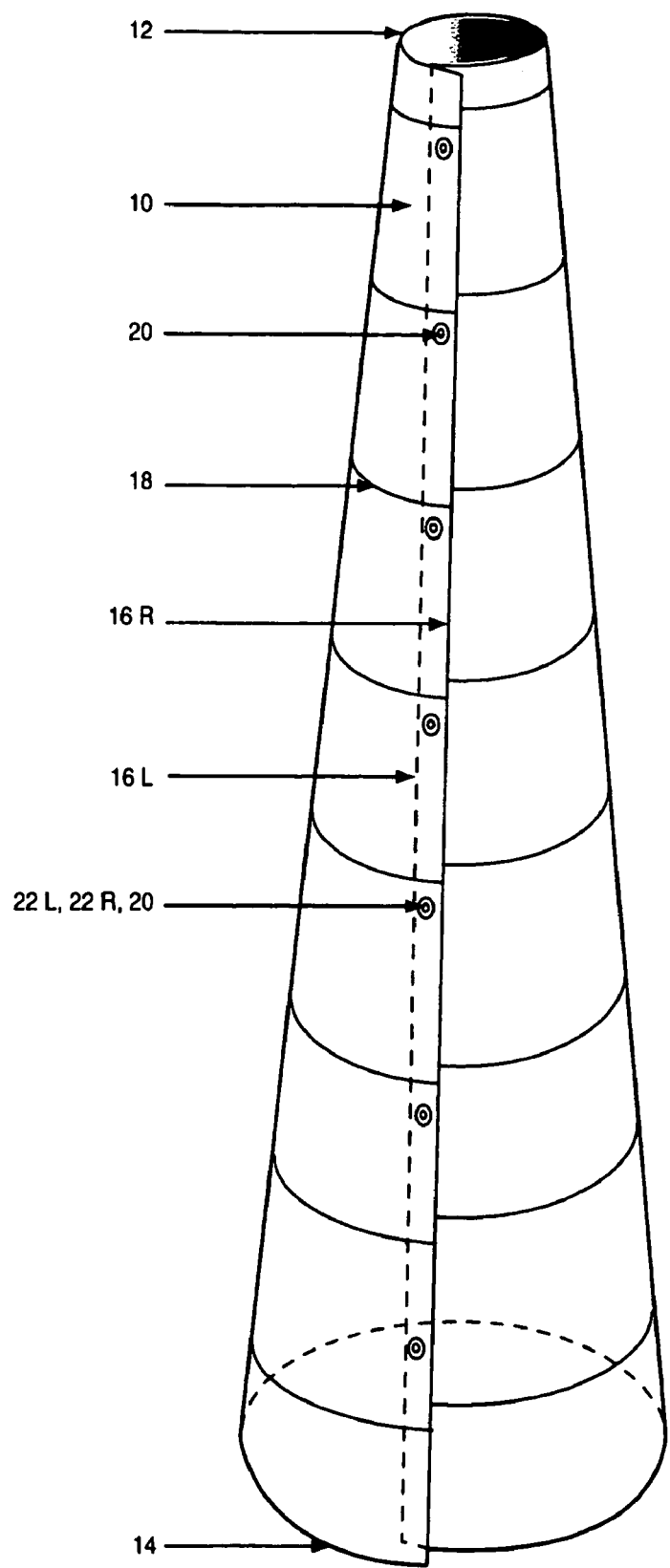
FIG. 1 is a side view of the mandrel 10 showing parallel lines which are size markings. For the sake of clarity, only markings at one inch intervals are shown and markings at quarter of an inch interval are not shown.

Nomenclature
   10 Beaded Jewelry Mandrel
   12 Top Edge, First Radius
   14 Bottom Edge, Second Radius
   16R and 16L Straight Overlapping Edges
   18 Inscribed Parallel Arced Lines
   20 Buttons Holding the Device Together
   22L and 22R Through Holes Associated with Buttons
   24 Inscribed Parallel Arced Lines at one quarter inch intervals
   26 Measurement Indicia
   28 Inscribed Indicia Indicating Jewelry Items and Body Parts
   30 Human Wrist
   32 Bead Radius
   34 Bracelet Diameter
   36 First Bead
   38 Bracelet
   40 Second Bead
   42 Wrist Diameter
   46 Wrist Circumference
   48 Bracelet Circumference and Bracelet Length
   50 Beading Wire
   52 Bead Hole
   54 Short Opposing Side
   56 Short Opposing Side
   58 Long Opposing Side
   60 Long Opposing Side
   62 Arrow
   64 Inscribed Measuring Indicia Construction For convenience, the term "bracelet" is used generically herein to include any article of beaded jewelry such as an ankle bracelet, necklace, upper arm bracelet, thigh garter or head band and will include both children's and adult sizes. The term "beading wire" will refer to any type of thread, wire, cable, elastic or cord used to string beads. The term "button" will refer to buttons as well as snaps, clips, hook and loop fasteners, etc.

The mandrel 10 comprises generally a hollow megaphone shaped device. More specifically, the present invention contemplates a megaphone shaped mandrel for determining the size of beaded jewelry. The mandrel comprises a megaphone shaped device having a top edge, 12, a bottom edge 14, an outer peripheral surface, having an opening extending from the upper end to the lower end. The mandrel is constructed from a flat planar sheet of flexible material stamped out using a rule die. The megaphone shape of the mandrel is achieved by rolling the material upon itself and attaching at a seam formed by the mating of opposing ends 16L and 16R. In the preferred embodiment, the mandrel is sized in conformity with the approximate size of a child's wrist at its smallest end 12 and the approximate size of a large adult's ankle at its larger end 14.

The mandrel 10 has a progressively increasing cross-sectional circumference from the smaller end of the device 12 to the larger end 14. If one were to take a plurality of cross-sections through the mandrel perpendicular to a longitudinal axis extending from one end of the mandrel to the other, each cross-section would be a circular one. The diameters of the cross-sections would progressively increase from one end to the other. Accordingly, a first end 12 is relatively narrow such that a circular cross-section through first end 12 would have a small diameter. The mandrel 10 then progressively tapers outwardly from the first end 12 until one reaches a second end 14 of the mandrel 10. The second end 14 of the mandrel 10 is relatively wide such that the mandrel 10 at its second end 14 would have a diameter much larger than the diameter of the mandrel 10 at the first end 12 thereof. In the preferred embodiment, the circumference of the mandrel 10 near its first end 12 is that of a child's wrist, approximately 4 inches. In the preferred embodiment, the circumference of the mandrel 10 near its second end 14 is that of a large adult's ankle, approximately 14 inches. While the 4 inch to 14 inch configuration is preferred, first end 12 of mandrel 10 could be smaller or larger than 4 inches and second end 14 could be smaller or larger than 14 inches. For example, the first end 12 of the mandrel 10 could accommodate an average adult wrist size of 7 inches while the second end 14 could accommodate an average adult neck size of 16 inches. The small end 12 could have a circumferential measurement suitable for a human neck, while its large end 14 could be suitable for a human thigh. A human neck typically measures between 14 inches and 18 inches in circumference. A human thigh can measure between 14 inches and 25 inches.

As shown, the mandrel 10 is approximately twelve and one half inches tall. While twelve and one half inches is preferred, the height can be more or less than twelve and one half inches. The height of the mandrel can vary according to whether it will be used for making jewelry other than bracelets at its small end and anklets at its large end.

Inscribed parallel lines 18 are perpendicular to the longitudinal axis of the mandrel. The parallel lines sequentially graduate in circumferential size and define graduated jewelry sizes. For the sake of clarity, only markings at one inch intervals are shown and markings at quarter of an inch intervals are shown in another view. The straight opposing end 16L is shown in phantom.

FIG. 1 shows buttons 20 holding the device together. Buttons 20 join opposing ends 16L and 16R by attaching through the through holes 22L and 22R.

In a preferred alternative embodiment, adhesive tape rather than buttons 20 is used to mate the opposing ends 16L and 16R. The type of material used and its degree of rigidity will dictate whether adhesive tape will function better than buttons or snaps. Some materials, when buttoned together will buckle outward between the buttons and thereby inadvertently increase the circumference of the mandrel 10 midway between each button.

Figure 2:
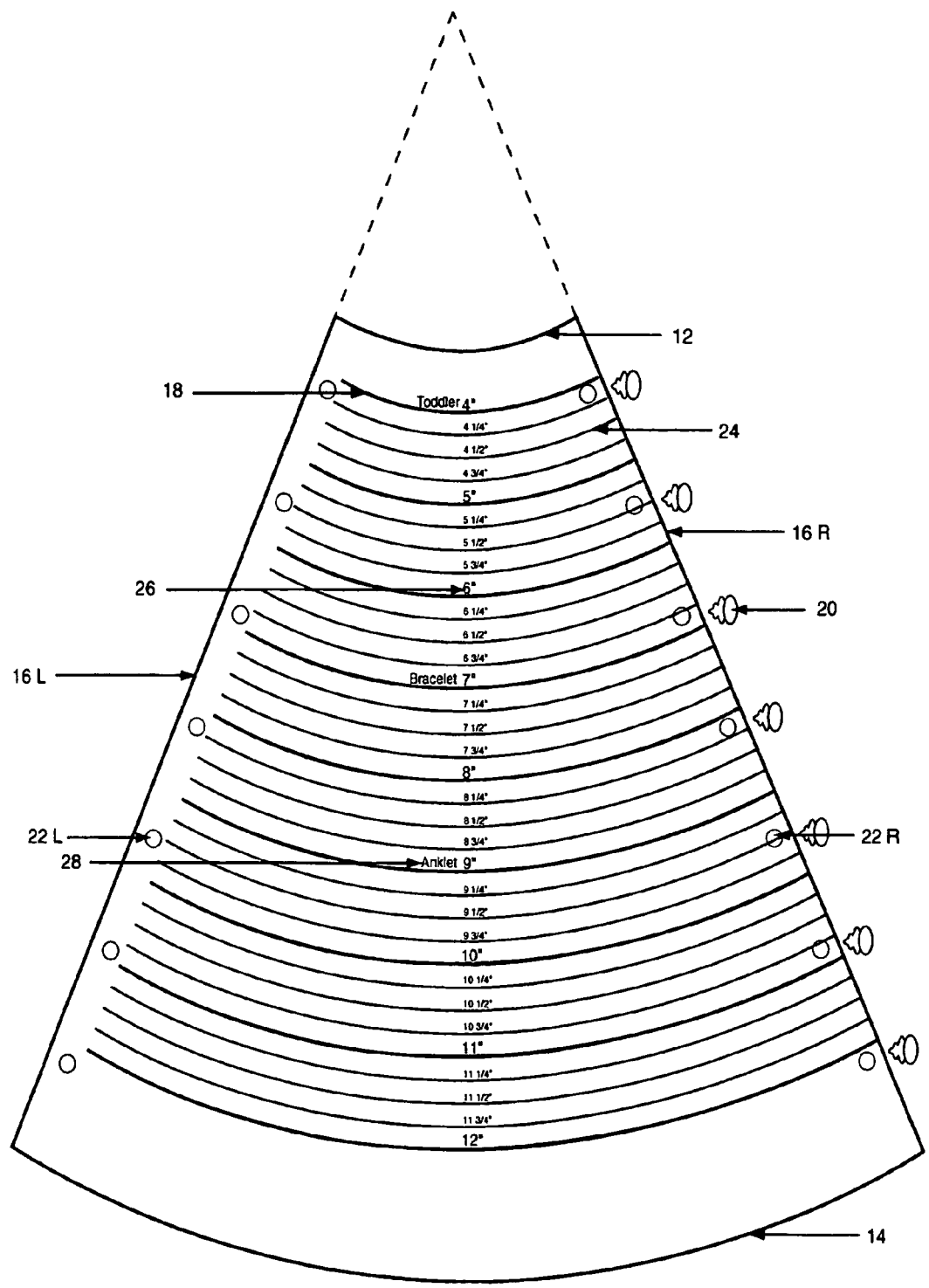
FIG. 2 is a view of the mandrel before assembly showing a flat piece of flexible material ready for assembly into the megaphone shape. This view shows the size indicia at quarter of an inch intervals.

FIG. 2 is an elevational view of the mandrel 10 before assembly showing a planar surface comprised of a flexible material. The planar surface shown in FIG. 2 is shown ready for assembly into the megaphone shape illustrated in FIG. 1. FIG. 2 shows buttons 20 and their corresponding through holes 22R and 22L. The device is comprised of a planar, flexible material having an arced top edge 12 formed by a first radius, an arced bottom edge 14 formed by a second radius greater than the first radius. Inscribed mutually parallel lines 18 represent third and fourth radii and so on. The first side edge 16L is equal in length to the second side edge 16R. The two straight opposing ends 16L and 16R mate upon assembly so that one side edge overlaps the other side edge.

FIG. 2 shows a plurality of mutually parallel arced lines 18 and 24 inscribed on the surface of the flexible material member, each of which are formed by a third and fourth radius and so on, 18 and 24 being greater than the first radius 12 and less than the second radius 14. The arced inscribed lines represent circumferential measurements at one inch intervals 18 and at quarter inch intervals 24. Measuring indicia 26 associated with the inscribed lines correspond to possible wrist and ankle measurements. In the preferred embodiment, the mandrel 10 will have markings at every one quarter of an inch circumference interval 24 from four inches circumference to fourteen inches in circumference. In an alternative preferred embodiment, the mandrel would have circumferential markings at one centimeter intervals or two centimeter intervals.

If one were to draw a line from the first end 12 to the second end 14, the parallel lines marking the circumferential intervals perpendicular to the drawn line, would be approximately one quarter of an inch apart from each other. While ¼ inch is preferred, the spacing of the measuring indicia can be more or less than ¼ inch. However, spacing the measuring indicia at smaller intervals will result in difficulty in reading jewelry sizes as the indicia will be too close together to be useful. Spacing the measuring indicia at larger intervals will result in a mandrel with a narrower range of sizes and thus a narrower range of utility for the jewelry artisan.

FIG. 2 also shows body size indicia 28 such as "toddler", "bracelet" or "anklet", for easy reference. In the preferred embodiment, body size indicia indicate average wrist and ankle measurements for children and adults. Body measurement indicia are preferred but not required. Body measurement indicia in alternative configurations could include typical measurements for arms, necks, thighs and heads.

Owing to the relatively triangular shape of the mandrel as shown in FIG. 2 prior to assembly, the design can be placed head to tail on large sheets of stock and printed several to a sheet. Several mandrels can be die-cut at once thereby saving money and minimizing wasted materials.

It is noted that the body of the device is sufficiently stiff that the megaphone can stand of its own accord as shown in FIG. 1 and of sufficient rigidity that when used by the jewelry artisan it will hold its shape when configured into the megaphone shape. The mandrel can consist of any material that can be repeatedly bent without fracturing, such as polyethylene, polypropylene, vinyl, nylon, rubber, leather, various impregnated or laminated fibrous materials, various plasticized materials, cardboard, paper, etc.

The material can be transparent with the measuring indicia printed on the inside of the device, thereby preventing the markings from wearing off. The material can be opaque with the measuring indicia printed on the exterior surface.

The straight opposing sides 16L and 16R may be joined by any means suiting the material of which the mandrel is comprised. Adhesive tape or re-positionable adhesive tape may be used. A zipper, button or snap system may be utilized providing that the circumference of the assembled mandrel remains true to the measurement markings thereon.

Figure 3:
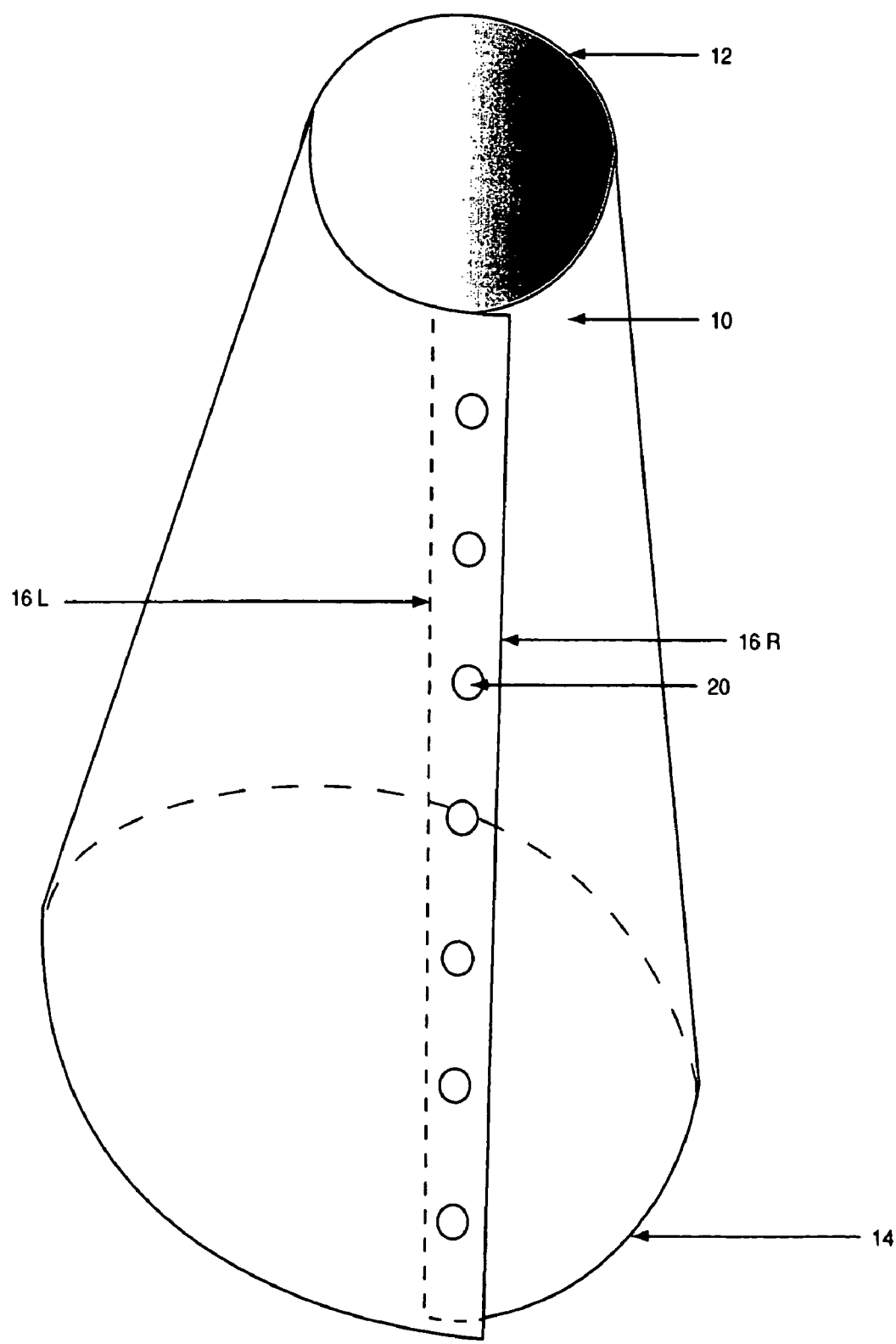
FIG. 3 is an elevational perspective view of the mandrel.

FIG. 3 illustrates an elevational perspective of mandrel 10.

Figure 4:
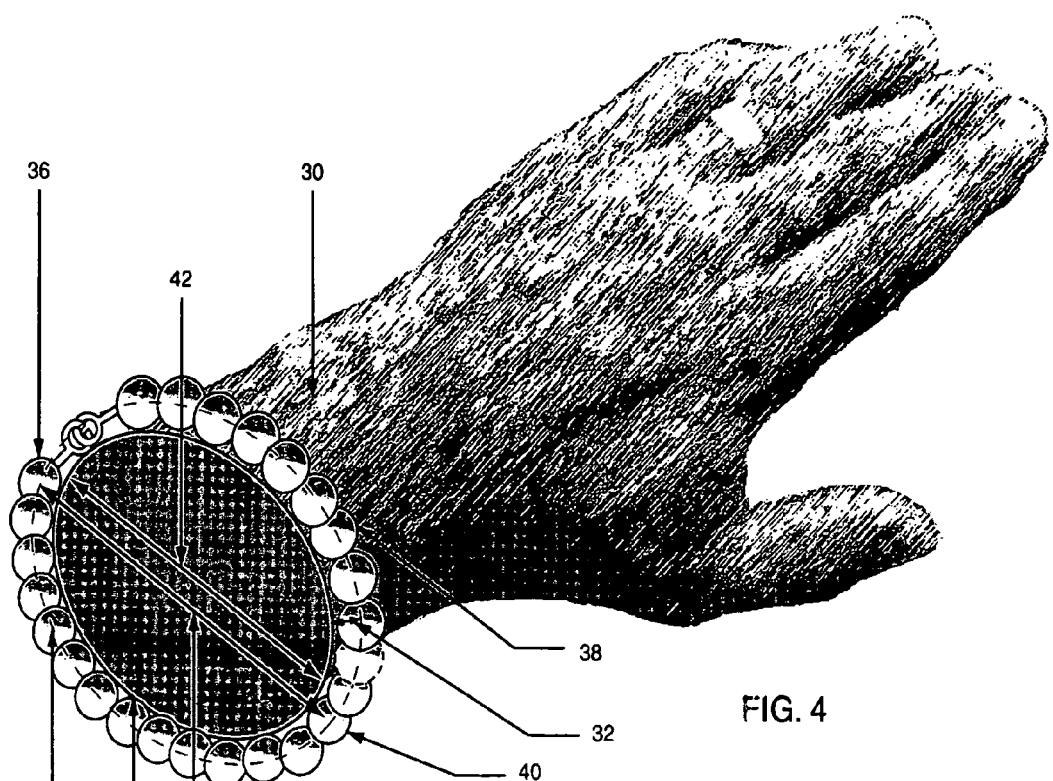
FIG. 4 is a cut away view of a person's wrist showing the affect that bead radius has on bracelet diameter and circumference.

FIG. 4 is a cross-sectional view of a person's wrist 30 showing the affect that bead radius 32 has on bracelet diameter 34. Bracelet diameter 34 is defined as the diameter from the center axis of a first bead 36 on the bracelet 38 through the wrist and ending at the center axis of another bead 40 directly opposite the first bead 36. Which two beads are used in determining bracelet diameter is irrelevant providing that bead 36 and bead 40 are 180 degrees apart in the circle defined by the bracelet as it is worn around the wrist. The diameter 42 of the wrist 30 will be smaller than the diameter 34 of the bracelet 38 as worn.

In like fashion, the circumference 46 of the wrist will be smaller than the circumference 48 of the wire 50 on which the beads are strung.

Figure 5:
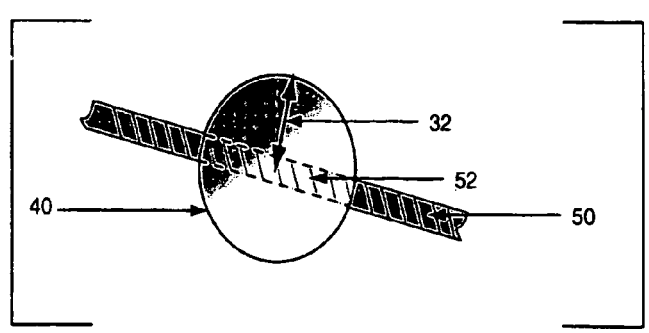
FIG. 5 is a cut away view of a bead showing its radius and showing beading wire inserted into the bead.

FIG. 5 is a cross-sectional view of a bead 40 showing in phantom the hole 52 through its center. The beading wire 50 is shown passing through the hole 52 of the bead 40. The radius 32 of the bead 40 is shown as the distance from the center of the bead's hole to its exterior surface.

Figure 6:
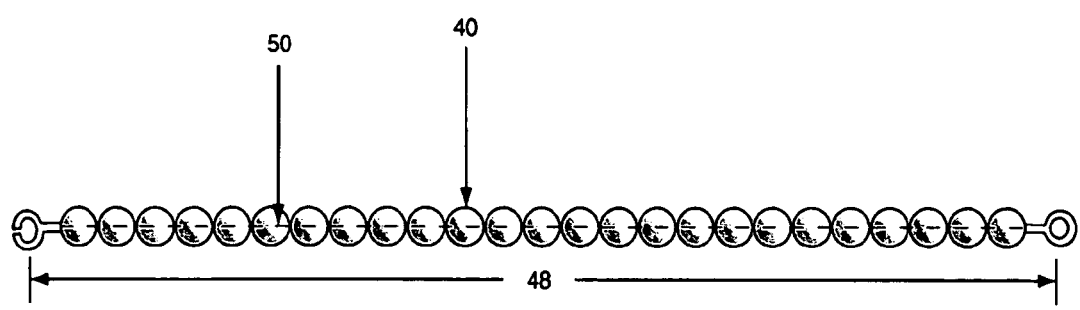
FIG. 6 is an aerial view of a beaded bracelet lying in a straight line on a flat surface.

FIG. 6 is an elevational view of a bracelet 38 laid in a straight line on a flat surface. The length 48 of the bracelet lying flat is shown. The length 48 of the bracelet 38 will equal the bracelet circumference 48 shown on FIG. 4.

If, for example, one wishes to make a beaded bracelet that will fit a 7" circumference 46 wrist, one might mistakenly make a bracelet that is 7 inches in length 48. If the bracelet is clasped to form a circle, the wire 50 running through the beads will form a circle 48 that is 7 inches in circumference. The radius of this circle will be 7 inches divided by 2 Pi, or 1.11 inches. If the beads are, for example, one half inch in diameter, their radius 32 is one quarter inch. The radius of the circle or wrist around which the beads will circumscribe will be reduced by the radius of the bead. Thus, the radius of this smaller circle or wrist will be 1.11 inches minus 0.25 inch which equals 0.86 inches. The circumference of this smaller circle or wrist will be 2 multiplied by Pi multiplied by 0.86 inches which equals 5.4 inches. The result is that a 7 inch long bracelet made with half inch diameter beads will fit a 5.4 inch wrist but not a 7 inch wrist.

Figure 7:
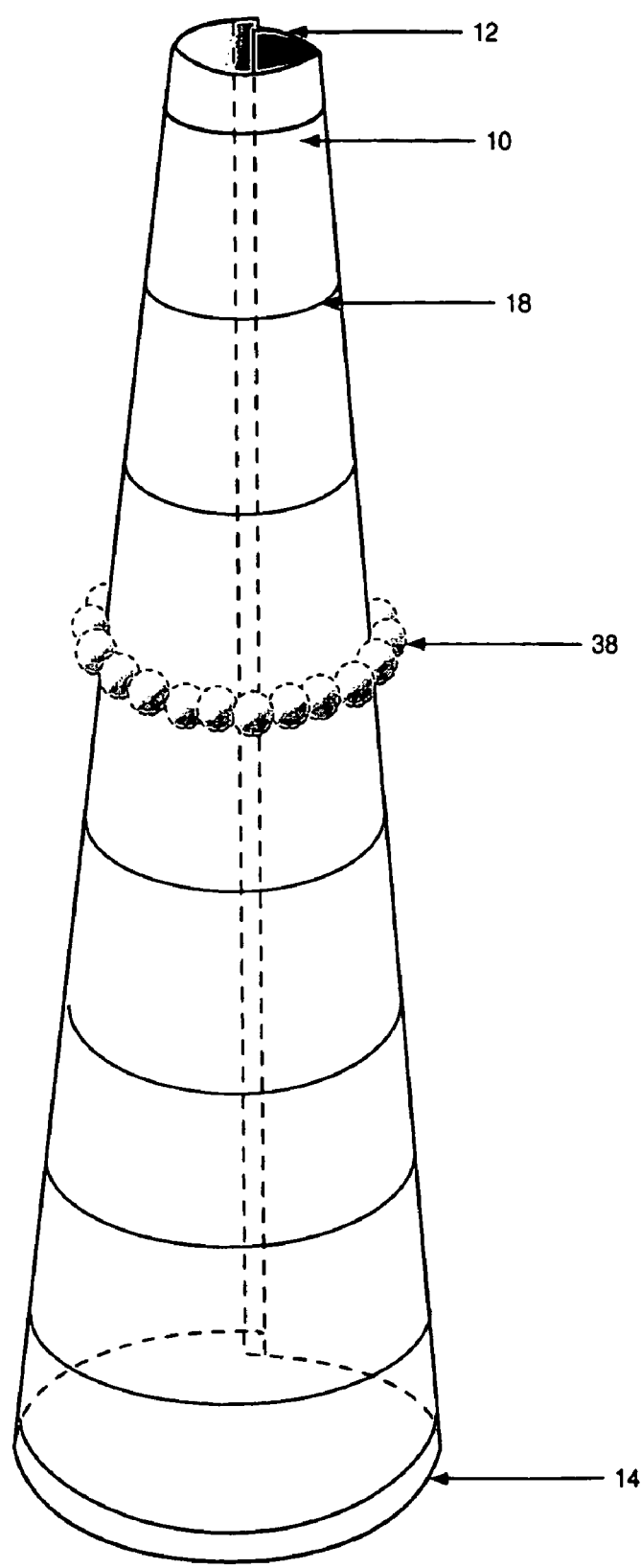
FIG. 7. is a side view of the mandrel showing an assembled bracelet fitted over the device for size adjustment.

FIG. 7 is a side view of the mandrel 10 showing an assembled bracelet 38 fitted over the device for size adjustment.

Figure 8:
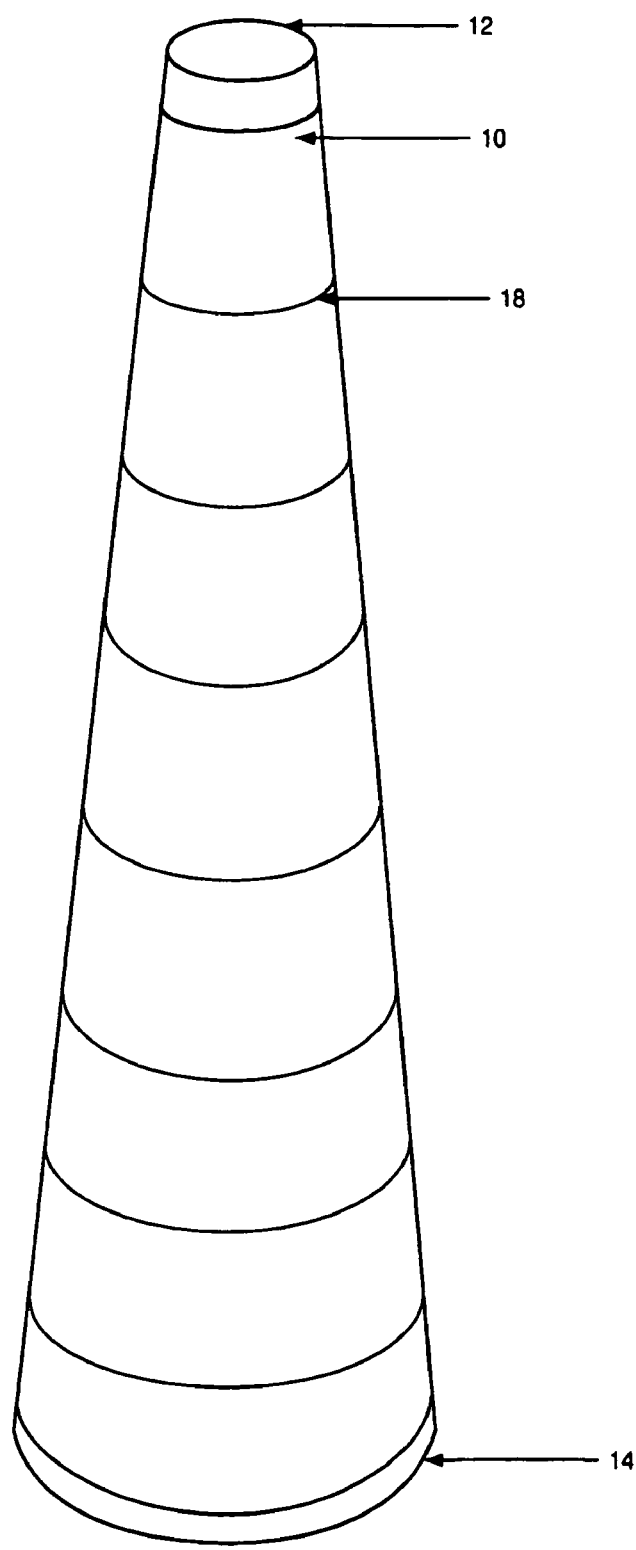
FIG. 8 shows a megaphone shaped mandrel of unitary construction according to another embodiment of the invention.

FIG. 8 shows a megaphone shaped mandrel of unitary construction according to another embodiment of the invention. It is envisioned that the mandrel can be of unitary construction requiring no assembly by the end user. The preformed megaphone shape can be hollow or solid and constructed of virtually any light weight material that can maintain its shape. A light weight material such as plastic or wood is preferred for its portability. The small end of the mandrel will have a circumference no greater than 5 inches, approximately 1.6 inches diameter. The large end will have a circumference no smaller than nine inches, approximately 2.9 inches diameter. As with the preferred embodiment shown in FIGS. 1 through 7, the mandrel of unitary construction shown in FIG. 8 has inscribed parallel lines in sequentially graduated circumferences. The parallel lines sequentially graduate in circumference from the small end to the large end and define graduated jewelry sizes. The indicia indicate circumferential measurements in quarter of an inch increments or their approximate metric equivalents.

Figure 9:
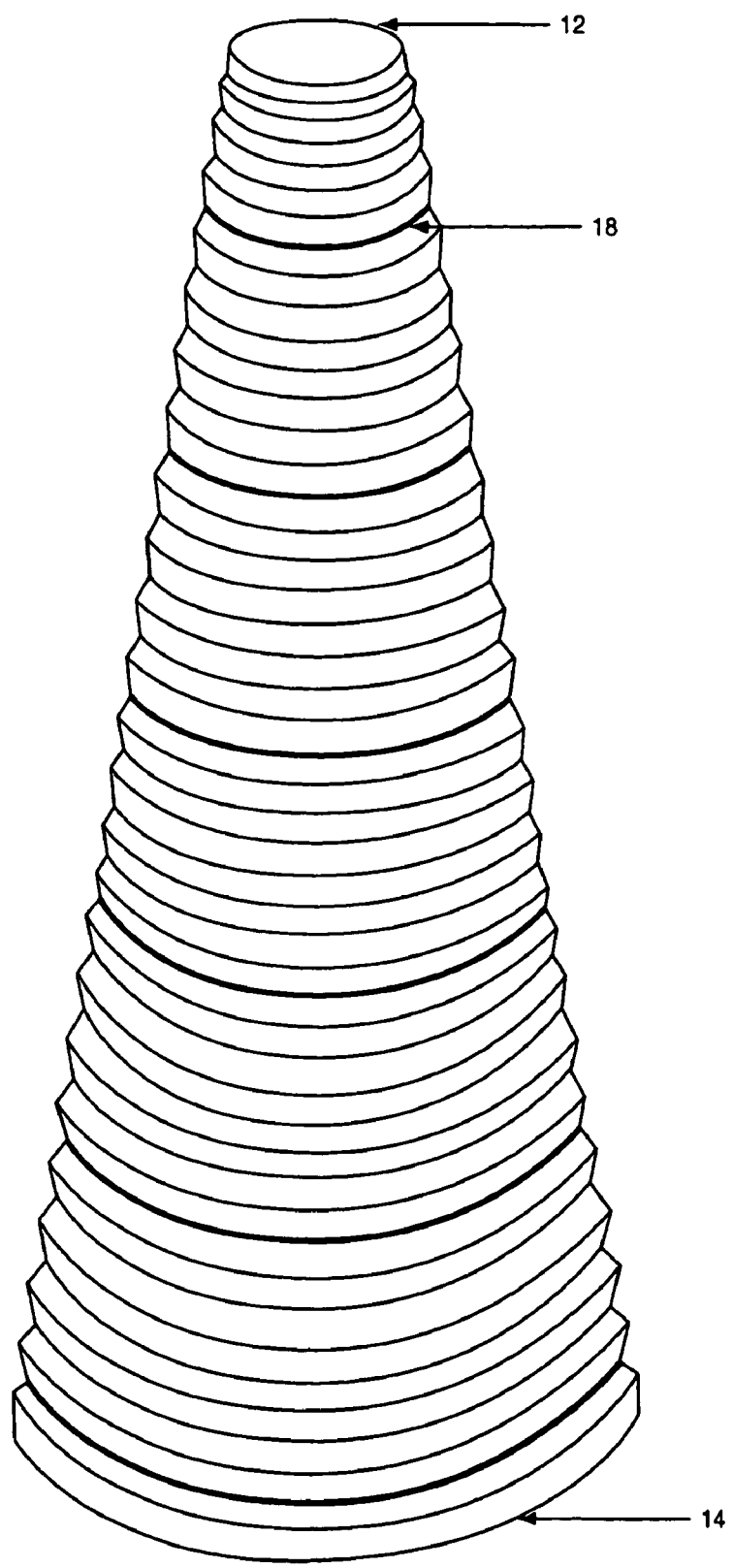
FIG. 9 shows a terraced megaphone shaped device according to another embodiment of the invention.

FIG. 9 shows a terraced megaphone shaped device according to another embodiment of the invention. The terraced steps correspond to sequentially graduated jewelry sizes. The jewelry designer chooses an appropriate circumferential marking to determine the size of the finished article of beaded jewelry.

Figure 10:
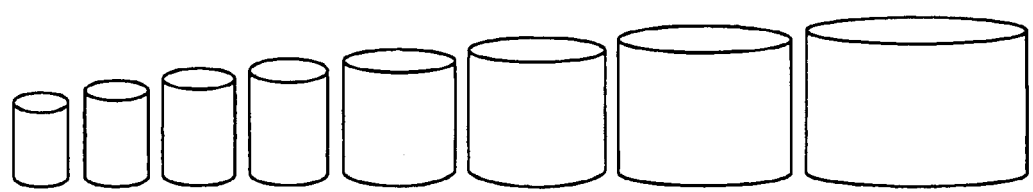
FIG. 10 shows a series of cylinders of graduated diameters according to another embodiment of the invention.

FIG. 10 shows a series of cylinders according to another embodiment of the invention. The cylinders are sequentially graduated in circumference representing an array of jewelry sizes. Measurement indicia would be imprinted on each cylinder indicating its exterior circumference. The jewelry designer would choose the cylinder with the same circumference as the wrist of the intended wearer. The appropriate cylinder will then aid the designer in judging the size of the beaded jewelry.

Figure 11:
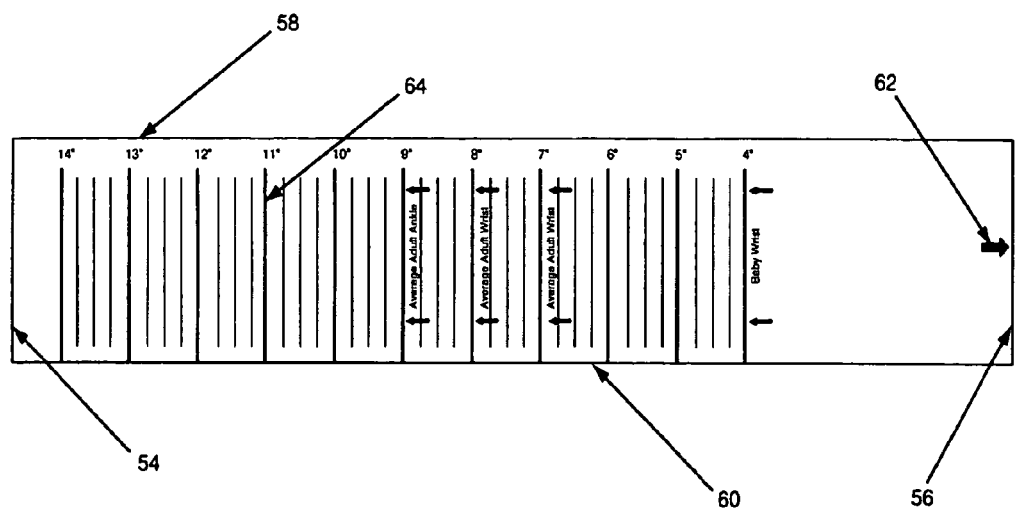
FIG. 11 shows a cylindrical jelly roll version of the mandrel prior to assembly according to another embodiment of the invention.
Figure 12:
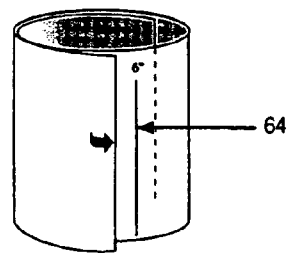
FIG. 12 illustrates a cylindrical jelly roll version of the mandrel assembled for use.

FIG. 11 shows another version of the invention which is comprised of a rectangular planar surface comprising two opposing short sides 54 and 56 and two transverse longer sides 58 and 60. The device is curled upon itself jelly roll fashion starting with side 54 so that side 56 overlaps side 54. A pointing indicia 62 such as an arrow, is aligned with one of the measuring indicia 64 as shown in FIG. 12. The device is then fixed in place using adhesive tape or other suitable means. The jewelry designer then uses the resulting cylinder to determine the size of the article of beaded jewelry.

FIG. 12 shows the jelly roll version of the mandrel in its rolled up condition.

In every version of the beaded jewelry mandrel, the mandrel serves as a form substituting for the intended wearer. Perfect fit is guaranteed without the ultimate wearer of the item being present for fittings.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling with the scope of the invention.

HOW TO USE THE PREFERRED EMBODIMENT

The following description, while referring to bracelet construction, applies generally to the construction of other articles of beaded jewelry including anklets, necklaces, chokers, thigh garters, head bands and arm bracelets.

The mandrel is utilized for bracelet assembly generally as follows:

The user joins the straight edges 16R and 16L together such that 16R overlaps 16L and the through holes (if provided) 22R and 22L line up with each other. The user then pushes the buttons 20 into through holes 22R and 22L holding the two corresponding straight edges 16R and 16L together. If adhesive tape is used rather than buttons, the device will simply be taped together. In alternative embodiments the device needs no assembly.

The assembled mandrel is placed on the work surface. The jewelry designer strings beads onto a thread, wire, cord or other beading medium to the approximate size of the intended item such as a bracelet. Enough beads are added to the wire to approximate the desired length of the finished bracelet. For example, if one is making a beaded bracelet for a wrist that measures 7 inches in circumference, one will string enough beads to cover up approximately 6.5 inches of beading wire. The clasp will account for approximately one half to three quarters of an inch of the finished bracelet. It is helpful to use adhesive tape on both ends of the wire to avoid the inadvertent loss of beads at this point. The unfinished bracelet is then held in the jewelry designer's hands so that the bracelet wraps around the mandrel at a marking slightly larger than the wrist size for which it is intended. This will allow for a bracelet that is not too tight. The designer will also take into account whether the intended wearer prefers loose fitting jewelry or snug fitting jewelry. By holding the unfinished bracelet around the mandrel, the jewelry designer can determine whether more or fewer beads are needed, taking into account whether a clasp will be added and if so, the size of the clasp. So, for example, when making a bracelet for a 7 inch wrist, the designer may wish to make the bracelet so that it fits snugly at the 7.5 inch marking on the mandrel. The extra half inch will allow for comfortable muscle movement. Assembly of the bracelet is then completed by crimping or knotting the beading cord so as to affix the clasp in place and no further adjustment to the bracelet will be needed.

I claim:

1. A method for measuring while fabricating circular jewelry of a predetermined circumference comprising the steps:

(a) providing a measuring device comprising a planar, flexible material member having an arced top edge formed by a first radius, an arced bottom edge formed by a second radius greater than the first radius, the arced bottom edge longer than the arced top edge, and first and second side edges of equal length; fastening means secured along one side edge for securing the first and second side edges together in an overlapping condition; and a plurality of mutually parallel arced lines inscribed on a surface of the flexible material member, each arched line extending essentially between the first and second side edges, each arced line formed by a third radius greater than the first radius and less than the second radius, each arced line associated with a measuring indicia adjacent thereto, (b) securing together overlapped first and second side edges of the flexible material member by the fastening means such that one end of each parallel arced line meets the other end thereof, producing a hollow, conical structure;

(c) encircling a length of jewelry having first and second ends around the hollow, conical structure at a selected arced line thereon, the arced line corresponding to the predetermined circumference for the circular jewelry; and (d) joining the first and second ends of the length of jewelry such that the length of jewelry encircles the conical structure at the selected arced line corresponding to the predetermined circumference for the circular jewelry.

2. The method for measuring while fabricating circular jewelry of a predetermined circumference of claim 1, further including the step:

(b) positioning the arced bottom edge of the hollow, conical structure on a support surface; between steps (b) and (c).

3. The method for measuring while fabricating circular jewelry of a predetermined circumference of claim 1, wherein step (d) includes joining the first and second ends of the length of jewelry with a releasable fastener.

4. The method for measuring while fabricating circular jewelry of a predetermined circumference of claim 1, wherein the length of jewelry includes beaded jewelry.

5. A method for measuring while fabricating circular beaded jewelry of a predetermined circumference comprising the steps:
(a) providing a measuring device comprising a planar, flexible material member having an arced top edge formed by a first radius, an arced bottom edge formed by a second radius greater than the first radius, the arced bottom edge longer than the arced top edge, and first and second side edges of equal length; fastening means secured along one side edge for securing the first and second side edges together in an overlapping condition; and a plurality of mutually parallel arced lines inscribed on a surface of the flexible material member, each arched line extending essentially between the first and second side edges, each arced line formed by a third radius greater than the first radius and less than the second radius, each arced line associated with a measuring indicia adjacent thereto,
(b) securing together overlapped first and second side edges of the flexible material member by the fastening means such that one end of each parallel arced line meets the other end thereof, producing a hollow, conical structure;
(c) encircling a length of beaded jewelry having first and second ends around the hollow, conical structure at a selected arced line thereon, the arced line corresponding to the predetermined circumference for the circular beaded jewelry; and
(d) joining the first and second ends of the length of beaded jewelry such that the joined length of beaded jewelry encircles the conical structure at the selected arced line corresponding to the predetermined circumference for the circular beaded jewelry.

6. The method for fabricating circular jewelry of a predetermined circumference of claim 5, further including the step:
(b) positioning the arced bottom edge of the hollow, conical structure on a support surface; between steps (b) and (c).

7. The method for measuring while fabricating circular jewelry of a predetermined circumference of claim 5, wherein step (d) includes joining the first and second ends of the length of beaded jewelry with a releasable fastener.

8. A method for measuring elongated material comprising the steps:
(a) providing a flexible member having an arced top edge having a first radius, an arced bottom edge having a second radius greater than the first radius, and first and second side edges, the flexible member further having:
(i) fastening means secured along one side edge for securing the first and second side edges together; and
(ii) a plurality of parallel arced lines disposed on the flexible member,
(b) securing the first and second side edges of the flexible member by the fastening means such that the flexible member has a conical configuration;
(c) encircling elongated material around the conical flexible member at a selected arced line thereon, the arced line corresponding to a predetermined length for the elongated material; and
(d) joining two ends of the elongated material such that it encircles the conical flexible member at the selected arced line corresponding to the predetermined length.

* * * * *